United States Patent [19]

Fedele

[11] Patent Number: 4,903,269
[45] Date of Patent: Feb. 20, 1990

[54] ERROR DETECTOR FOR ENCODED DIGITAL SIGNALS

[75] Inventor: Nicola J. Fedele, Kingston, N.J.

[73] Assignee: General Electric Company, Schenectady, N.Y.

[21] Appl. No.: 194,657

[22] Filed: May 16, 1988

[51] Int. Cl.$^4$ .................................. G06F 11/00
[52] U.S. Cl. ............................ 371/57.2; 358/261.1
[58] Field of Search ..................... 371/57, 55, 62, 65, 371/57.1, 57.2; 358/257, 260, 261.1, 263, 264, 133; 382/51, 56; 370/82; 375/117

[56] References Cited

U.S. PATENT DOCUMENTS

| | | |
|---|---|---|
| 3,273,121 | 9/1966 | Taylor . |
| 3,633,162 | 1/1972 | Findelson . |
| 3,646,445 | 2/1972 | Reinol . |
| 3,652,987 | 3/1972 | McCarthy .............................. 371/57 |
| 4,048,440 | 9/1977 | Peck ...................................... 375/117 |
| 4,161,719 | 7/1979 | Parikh ............................... 370/82 X |
| 4,177,447 | 12/1979 | Jaouen ................................... 371/57 |
| 4,296,439 | 10/1981 | Teramura ......................... 371/57 X |
| 4,296,440 | 10/1981 | Rosenheck ........................... 358/257 |
| 4,617,662 | 10/1986 | Auer ..................................... 417/420 |
| 4,689,690 | 8/1987 | Aagand ........................... 358/263 X |
| 4,716,471 | 12/1987 | Yokomizo ....................... 358/263 X |

Primary Examiner—Jerry Smith
Assistant Examiner—Robert W. Beausoliel
Attorney, Agent, or Firm—Paul R. Webb, II; James C. Davis, Jr.

[57] ABSTRACT

A line marker signal is added to a DPCM encoded video signal to mark the beginning of each video scan line. The receiver searches for this marker signal and counts pixels between received markers, each scan line having a known number of pixels. The pixel count is checked against the known number of pixels in an error free system. If the pixel count differs from the known count, an error is indicated. The line marker signal is used to reset the decoder so the receiver is resynchronized at each scan line.

13 Claims, 3 Drawing Sheets

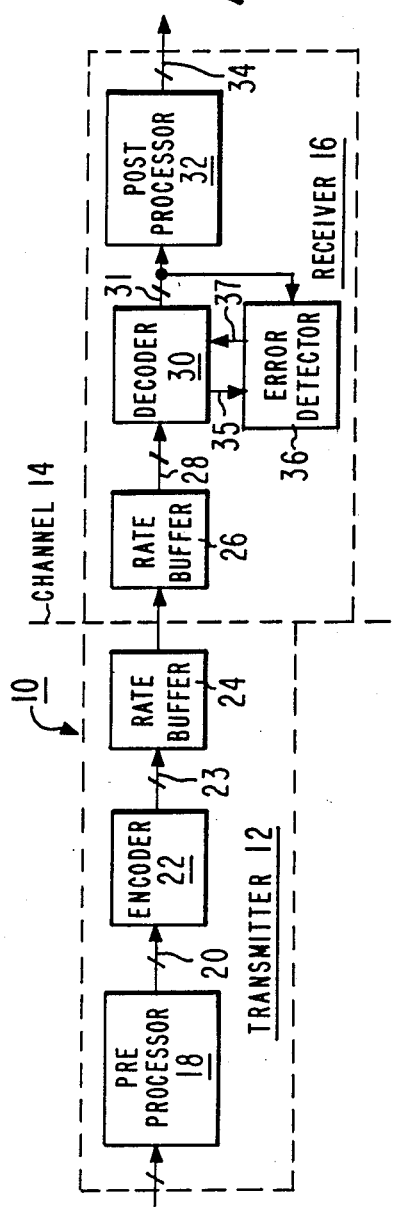
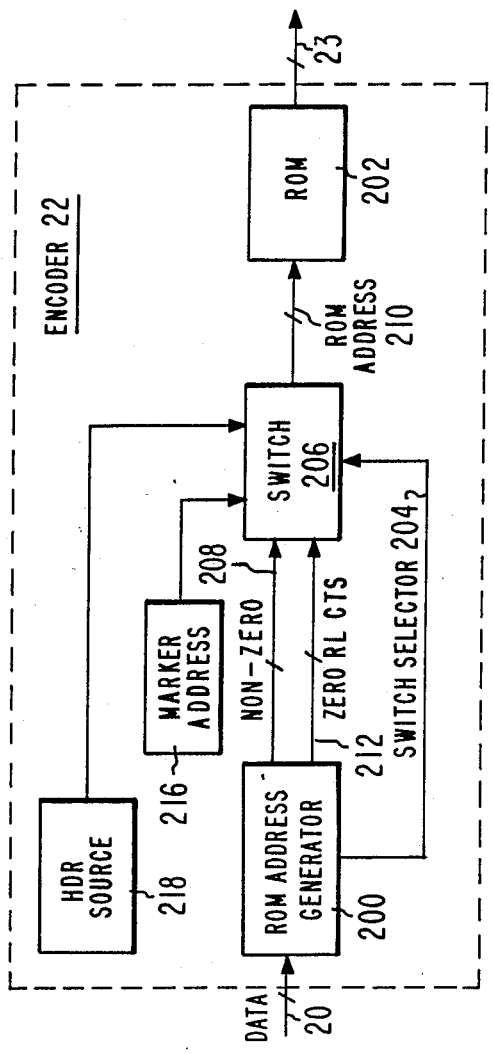

ERROR DETECTOR FOR ENCODED DIGITAL SIGNALS

This invention relates to error detectors for indicating error conditions in transmitted encoded digital signals.

Of interest are copending applications Ser. No. 130,379 filed Dec. 8, 1987 entitled "Modified Statistical Encoder" in the name of N. J. Fedele now U.S. Pat. No. 4,813,056, Ser. No.158,171 entitled "Decoder for Digital Signal Codes" filed Feb. 19, 1988 in the name of Bingorani et al. now U.S. Pat. No. 4,832,251, Ser. No. 194,656 filed concurrently herewith entitled "Refresh System for Digital Signals" in the name of Acampora et al. and Serial No. 194,671 filed concurrently herewith entitled "Refresh System for Digital Signals with Refresh Cycle Synchronization" in the name of Fedele et al. now U.S. Pat. No. 4,831,439, all assigned to the General Electric Company.

Where the bandwidth available in the transmission channel is limited, it is desirable to compress to as large extent as possible video data to be transmitted. Numerous schemes have evolved for increasing the efficiency of such compression during transmission while not introducing too intrusive reduction in image quality. For example, one kind of system known as differential pulse code modulation (DPCM) employs a predictive scheme for predicting pixel values of a video picture. The predicted information is compared to the actual information based on spatial or temporal relationships and an error signal is generated representing the differences between the two information signals. The error signals are further reduced in information content by more coarsely quantizing them—that is, by placing them into range bins. The coarser quantization contributes to optimimzing the compression of the statistical encoding procedure. The coarsely quantized information is encoded using codewords of variable bit length according to statistical parameters.

Huffman has described procedures for describing variable length codes optimally. Further improvements in coding efficiency can be obtained by treating certain runs of successive bin values that are all alike differently from other bin values. Runs of certain length and value that are likely to occur can be classified as special cases and included in the statistical coding procedure, to be accorded short bit length codewords reflective of their tendency to frequently occur. This implies that signals having long run lengths may be converted to relatively short codewords which drastically increase the efficiency of the transmission system.

In information signals wherein a relatively large proportion of the information being transmitted is redundant and exhibits relatively little error from one block of information to a second block, the error signals tend to exhibit relatively long zero run lengths. By way of example, in a video signal transmitting picture information, a given 4.4 MHz image image scan line has 240 active pixels. The resultant error signal in a predictive system thus can have zero run lengths of up to 240 zeros in a given scan line representing a still picture for that scan line and n non-zero levels outputted by the quantizer representing different degrees of motion. The result is a potential of over 240 different codewords being required to accurately represent the information signal. A problem arises in this kind of environment wherein transmission errors can occur which can cause loss of information in the transmitted signal, for example, one or more pixels to one or more scan lines.

At the receiver, the coded error signal is decoded and summed with a current predicted signal in what is referred to as the inverse DPCM loop. The receiver reconstitutes the coded signal with an inverse process. The predictor delay circuit in the inverse DPCM loop thus stores a prior received decoded signal to be summed to the current received decoded error signal to create the next prediction.

The loss of such data in the transmitted signal can have serious affects on the resultant received image from loss of image to deleterious reduction in image quality. A further problem is that due to the fact that the transmitted signal is heavily coded, it becomes relatively difficult to detect when the encoded received signal has such errors. A further problem is recovering from such data loss, especially in a DPCM system which is dependent on prior received data.

According to the present invention, an error detector detects the loss of data items in an encoded digital data information signal in a communication system. The signal comprises a plurality of codewords which may have different lengths, each codeword manifesting the value of at least one data item and wherein one or more data items may be lost in transmission. Means periodically provide the data information signal a reference marker signal such that the data information signal has a given number of data items between adjacent successive reference marker signals. Means are responsive to the information signal and the marker signals applied as an input thereto for determining the number of received data items between each of the adjacent received successive reference marker signals. Means produce an error condition indication when the determined count of the received data items and the given number differ.

In the drawing:

FIG. 1 is a block diagram of a transmission system employing a digital signal error detector according to one embodiment of the present invention;

FIG. 2 is a more detailed block diagram of the encoder of the embodiment of FIG. 1;

Figure 3:
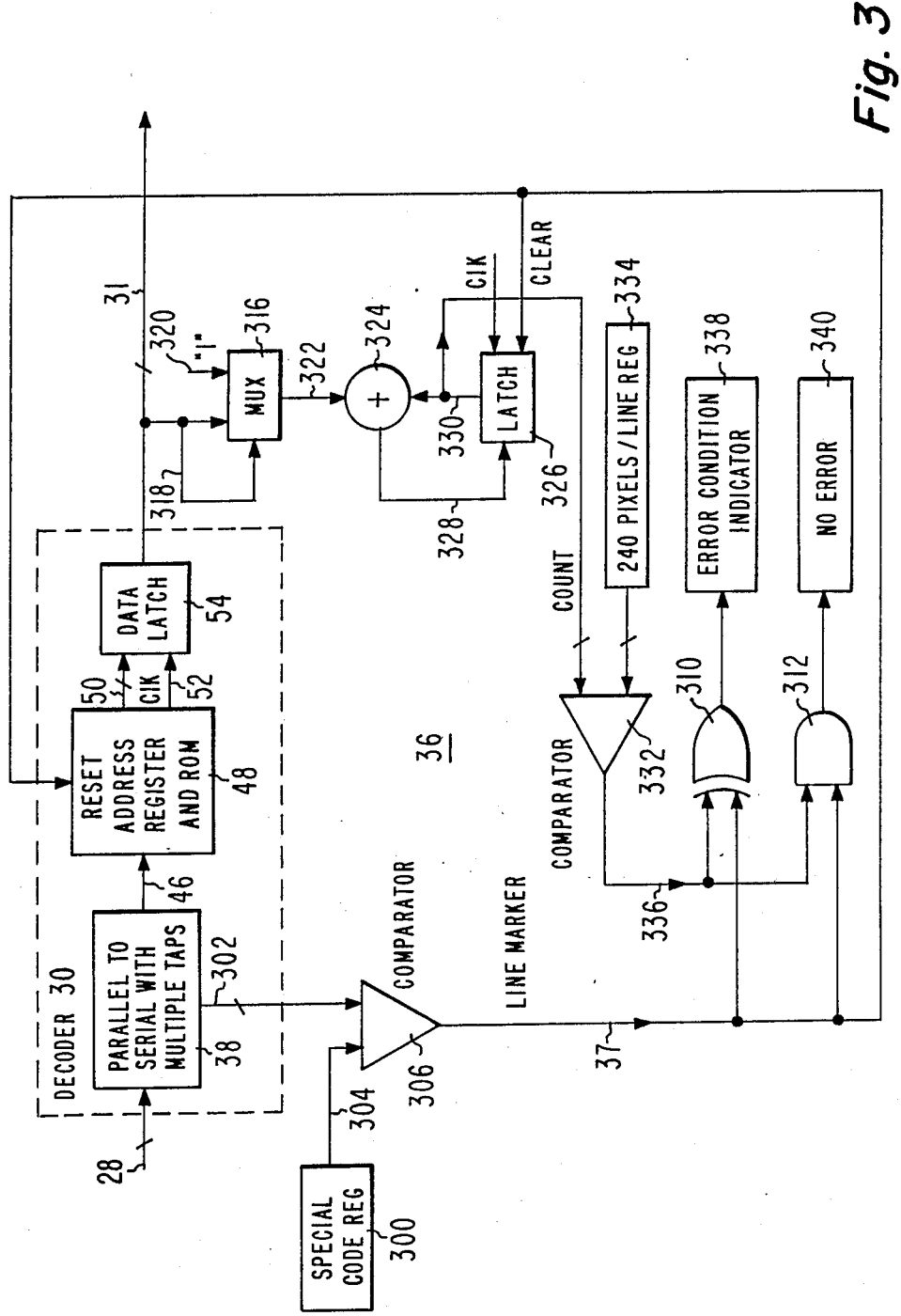
FIG. 3 is a block diagram of the decoder and error detector of the embodiment of FIG. 1.

In FIG. 1, communication system 10 comprises a transmitter 12, a channel 14 over which the transmitter 12 transmits and a receiver 16. By way of example, the transmitter 12 and receiver 16 are described herein as a predictive picture encoder employing differential pulse code modulation (DPCM). However, the signals detected by the error detector of the present invention may be derived from sources other than error signals in a predictive system. For example, one source may be a straightforward PCM data signal.

System 10 includes a pre-processor 18. A source of an information signal (not shown), for example a digital video signal, applies the information signal to pre-processor 18. Pre-processor 18, may for example, include an analog-to-digital converter (ADC) (not shown) which finely quantizes the information signal in a known way to produce a multilevel digital signal. The output of the analog-to-digital converter (ADC) may be applied as an 8 bit pixel signal to a differential pulse code modulator (DPCM) loop (not shown). The DPCM loop is one that is generally available and well known. It includes, for example, a subtractor for subtracting predicted information signals produced by a predictor and delay loop (PD) from the finely quantized information signal to produce an error signal. The output of the PD loop is applied to the subtractor. The error signal produced by the subtractor is applied to a quantizer which assigns different values of the input error signal to a reduced number of output values or bins representing zero and non-zero values of the error signal. By way of example, the quantizer may have 32 bin values and a zero value, i.e., 32 non-zero values, for a total of 33 different values. The quantizer output values are applied to an adder from the DPCM output. The adder adds the quantizer output signals to the predictor and delay loop PD output and applies the added signals to the predictor and delay loop PD.

Such a DPCM loop may be, for example, as described in U.S. Pat. No. 4,706,260 and in several of the aforementioned copending applications, which describe prior art DPCM loops in greater detail.

In FIG. 1, the output of the pre-processor 18 is applied via conductor 20 to encoder 22. It should be understood that the term "conductor" herein refers to a single or multiline cables for carrying multiple signals in parallel. Assuming pre-processor 18 includes a DPCM loop as discussed above, encoder 22 is of a statistical type as discussed in the introductory portion. In particular, the encoding may be according to procedures described by Huffman for encoding variable length codes optimally. Further, encoder 22 may be of the type that encodes both non-zero and zero run lengths. One such encoder may be as described in U.S. Pat. No. 4,420,771 issued to Pirsch. In this patent, a coded representation of each run length as well as representation of the non frequent values which make up every other run are combined in a predetermined sequence. Different code tables are used to generate codewords for each type of information. Another system for encoding non-zero and zero run length values is disclosed in the aforementioned copending application entitled "Modified Statistical Coding of Digital Signals". However, still other encoders are known for statistically encoding digital signals.

In FIG. 2, one embodiment of encoder 22 is described in more detail. Encoder 22 includes a ROM address generator 200 for receiving data to be encoded. The ROM address generator may be one or more shift registers and logic circuitry, for example AND gates and inverters, for segregating non-zero and zero run length data into appropriate addresses to a code look up table in ROM 202. The address generator 200 analyzes the incoming data signal on conductor 20 for the presence of non-zero and zero run length data. If non-zero value data is detected, a signal is applied to conductor 204 which controls the state of switch 206. In this case, should non-zero value data be detected, then that non-zero value data is applied via conductor 208 to ROM 202 through switch 206. The switch position of switch 206 has previously been selected by the signal on conductor 204 in response to a positive test for a non-zero value to cause the signal on conductor 208 to address the ROM 202 with that selected data signal as an address.

The ROM 202 contains a code table, which for example, may comprise multiple ROM tables as disclosed in aforementioned U.S. Pat. No. 4,420,771. In the alternative, the ROM 202 code table may comprise a table similar to that described in the aforementioned copending application Ser. No. 130,379. In a still different alternative, the table may be one in which non-zero and zero run lengths are formed into a single table based on the Huffman procedure. In any case, ROM 202 includes a look up table comprising non-zero run length values corresponding to each of the received codewords on the data conductor 20 and zero run length values comprising binary numbers. Each binary number represents the number of zeros in a given run length. The data on conductor 20, if representing a non-zero value once identified as such by the generator 200, applies that data as an address to the ROM 202 via switch 206 and conductor 210.

If the received data on conductor 20 is a sequence of pixels representing a run length of a given number of zeros, the ROM address generator 200 determines that the data is in fact a run length of zero value pixels and applies a switch selector signal conductor 204 causing switch 206 to select conductor 212 as the address to ROM 202. In this case, address generator 200 generates a binary number representing one or more zero value pixels. That binary number on conductor 212 is applied through the selected switch 206 switch position to conductor 210 to address the look up table in ROM 202. Depending upon whether the address to the table ROM 202 is a non-zero or a run length value, an appropriate codeword is generated by ROM 202 on conductor 23.

While ROM 202 is represented by a single ROM block, in practice it may represent multiple ROMs or multiple storage areas in a ROM for storing different non-zero and zero run length values. In the alternative, the ROM 202 may comprise a table for a given set of codewords in which zero run lengths are not used. In this case, the address output of the ROM address generator would be one conductor, e.g., conductor 208, that is connected by switch 206 to ROM 202. A signal on conductor 204 causes switch 206 to connect generator 200 to ROM 202 when a data signal has been received on conductor 20 for encoding.

Switch 206 has an additional address input comprising a marker address source 216. The marker address source 216 provides an address to the ROM 202 which addresses a unique codeword in ROM 202 which represents a marker signal. In the case of a video signal, which by way of example, is described in this embodiment, the marker codeword created by ROM 202 when addressed by the marker address source 216 is generated at the beginning of each scan line in a video raster display system. To this extent, the switch 206 is switched to cause the address from source 216 to be applied to ROM 202 upon receipt of a locally generated horizontal drive sync signal (HDR) from source 218.

When the HDR signal from source 218 is applied to switch 206, switch 206 selects the address input from the marker address source 216 and that becomes the address to the ROM 202. ROM 202 then outputs a codeword on conductor 23 at the beginning of an encoded scan line. That marker codeword is unique only to line markers and may comprise a sufficiently unique robust combination of bits to be easily recognized by a decoder in the presence of a single bit error in that codeword. By way of example, such a marker codeword may comprise a set of prefix and suffix bits unique to a Huffman statistical procedure. A set of marker codewords is described in more detail in the aforementioned patent application Ser. No. 130,379.

Such marker codewords are inserted in the bit stream on conductor 23 at the beginning of each line or segment of data. What is unique about the position of the marker in the data stream is that all of the codewords on conductor 23 between markers represent the same number of data items, or in this case pixels. That is, for example, in a conventional raster display system there may be 240 pixels on a scan line. Thus, a marker is generated for every 240 pixels. Each pixel is represented by a given codeword. The exception, however, is in the case of zero run lengths. Each zero value in a set of zero run lengths represents a separate pixel. Therefore, a binary count of x zeros in a given scan line actually manifests x pixels in that scan line. However, in either case, whether the codewords on conductor 23 represent individual pixels or a binary number representing a consecutive sequence of pixels, the same number of pixels are always represented between the marker codewords on conductor 23. The line marker signal is to be differentiated from the HDR signal which is locally generated in the transmitter and in the receiver. Both signals are asynchronously generated relative to each other.

The output of encoder 22 on conductor 23, FIG. 1, is applied to rate buffer 24. Rate buffer 24 is a storage device which converts the variable length codewords on conductor 23 into a serial stream of bits for transmission over channel 14 to the receiver 16 at a fixed data rate. Buffer 24 is known in the art and such devices are described, for example, in one or more of the aforementioned patent applications and patent. Serial bits of the encoded digital information signal are transmitted to rate buffer 26 of the receiver 16. The output of buffer 26 is a parallel bit stream on conductor 28 which is applied to the decoder 30. Decoder 30 may be a conventional decoder for decoding the codewords on conductor 28. The decoder codewords are applied to a post processor 32 via conductor 31. The post processor may include an inverse differential pulse code modulation (DPCM) loop. The output of processor 32 is then applied via conductor 34 to subsequent processing for display of the video image.

Connected to decoder 30 is an error detector 36 which processes received information signals on conductor 28 applied to decoder 30 for detecting an error in the received information signal. Detector 36 also generates a line marker signal on conductor 37. The marker signal is used to reset the decoder for each received scan line. The detected error may comprise a missing data item in the signal which may, for example, be a missing pixel or one or more missing segments or lines, by way of example. Detector 36 detects whenever one or more pixels are missing in the data stream received from buffer 26. The missing one or more pixels may be due to transmission errors over channel 14 which in turn may be due to a number of different causes including detrimental atmospheric conditions. Error detector 36 provides a visual, audio or other indication whenever one or more pixels is missing from a given scan line. The marker signal on conductor 37 is the decoded received line markers generated by the encoder described above and are used to reset the decoder to each line or signal segment as will be explained.

In FIG. 3, decoder 30 and error detector 36 are shown in more detail. In describing decoder 30 and error detector 36, an assumption is made that the data signal received from the transmitter 12 comprises encoded, non-zero and zero run length data items. The problem with such a data signal as transmitted over channel 14 is that some of the codewords may represent a single data item, for example, a value of a single pixel. Other codewords may have values which represent a plurality of consecutive pixels as occurs in a given run length. Therefore, the different codewords in and of themselves may represent one or more pixels.

Decoder 30, FIG. 3, receives on conductor 28 the parallel bit stream of codewords from the buffer 26 (FIG. 1). These parallel bits of the codewords are applied to a parallel-to-serial register 38 with multiple taps. One output of register 38 is supplied as a serial bit stream on conductor 46 to address register and ROM 48. ROM 48 comprise a decoding ROM containing a look up table for converting non-zero value codewords into parallel bit data streams representing the actual value represented by those non-zero value codewords. The table also contains binary numbers which represent the number of zeros in a run length for zero run length code words. An address register is included for addressing the particular ROM addresses based on the value of a given received codeword.

The ROM 48 senses whether a codeword represents a single pixel non-zero value or a run length value. If a non-zero value is sensed, then the ROM generates decoded data whose most significant bit (msb) on the output bus 50 indicates a non-zero codeword value has been decoded. If a run length codeword is sensed, then the ROM 48 generates a codeword on bus 50 which comprises a binary number representing the binary representation of the number of zeros in a given codeword whose most significant bit (msb) value indicates that a run length codeword is present. The codeword including the msb indicator bit is applied to output bus 50. ROM 48 also produces a clock signal on conductor 52 for clocking each decoded pixel data item of bus 50 into data latch 54.

Figure 4:
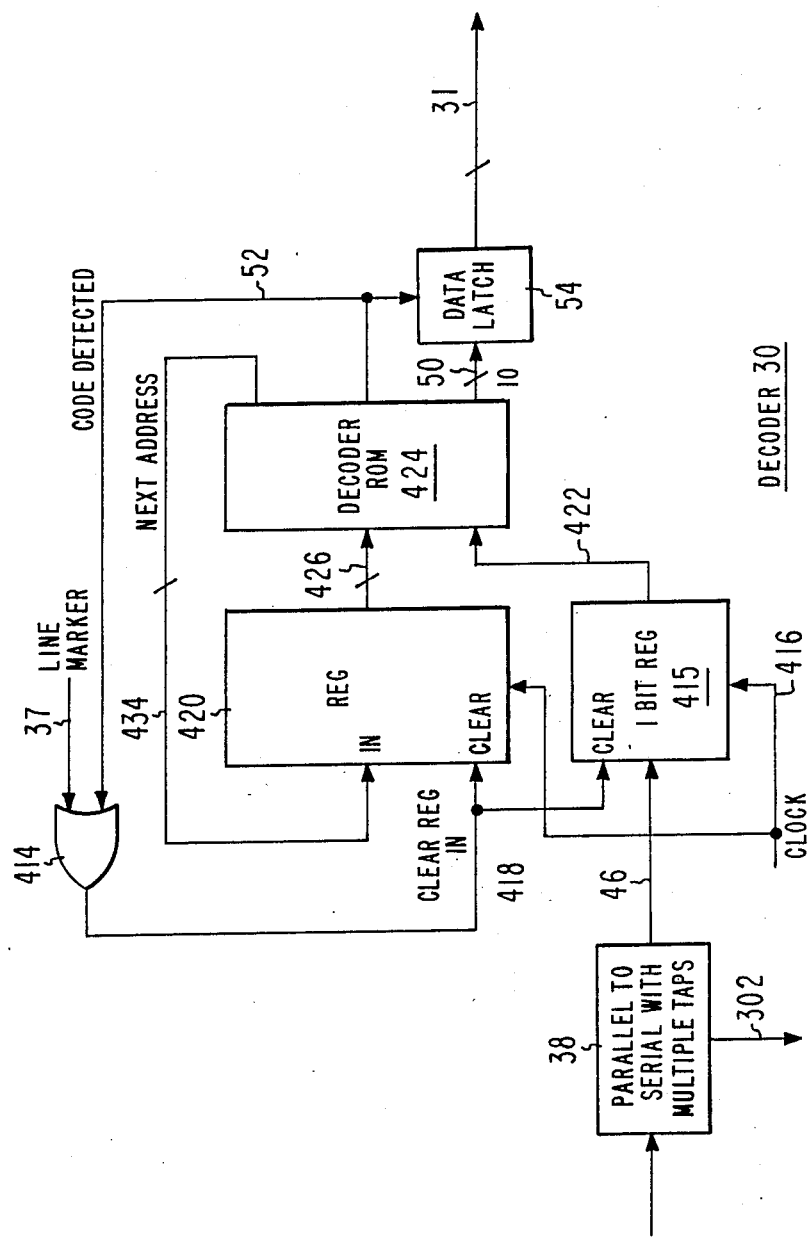
FIG. 4 is a block diagram of one implementation of the decoder in the embodiment of FIG. 3.

In FIG. 4, one implementation of decoder 30 is shown. The output of register 38 is applied to register 415 which is a 1-bit register sometimes referred to as a flip-flop. Register 415 receives a clock signal from a clock source on conductor 416 and a clear signal on conductor 418. The clear signal on conductor 418, received from OR gate 414, is also applied to register 420. The output of register 415 is applied via conductor 422 to the decoder ROM 424. The output of register 420 is applied on conductor 426 to decoder ROM 424. The outputs of registers 415 and 420 together form a look-up address to ROM 424.

Register 420 is an n-bit register which in this example may be 9 bits which combines with the 1 bit from register 415 to form a 10-bit address to the ROM 424. Each address in the decoder ROM 424 contains three fields, the data field, the next address field and the code detected or flag field. The data field contains the decoded data corresponding to a detected codeword as represented by the information from registers 415 and 420. The data for a decoded codeword is only at certain locations of the ROM. The next address field contains a next address code which comprises n bits forming a portion of the address to the next location of the ROM 424 to be addressed. The addresses of ROM 424 are sequenced with a binary tree algorithm. The ROM address registers 415 and 420 are initialized to zero when cleared. Stored in the ROM at the reset (clear) address location are n bits of data representing a next address portion, which when combined with a bit from register 415 forms the additional address creating a second or third branch address, depending on the value of the register 415 bit. Also stored in locations at those respective branch addresses are additional next addresses that point to additional nodes, i.e., other ROM locations, whose complete address is provided by the addition of the register 415 output bit to the address in the next address field.

For example, the first location accessed in ROM 424 may have an address of 000 created by clearing register 420 and a zero clocked into register 415. The next address field of ROM 424 at location 0 may have a partial address of 01. The least significant bit portion of the address is from register 415, in this case 0. If a zero is clocked into register 415 at the next clock, the following memory access would be to location 010. Thus, the bit from register 415 supplies an address branch from a node, i.e., node whose tree address is 01, of the binary tree search algorithm. The procedure is continued until a codeword is found. That codeword represents either a pixel for non-zero values or a number of pixels for run lengths according to the number of pixels in that run. The address to a binary tree node represented by the next address field, is stored in the ROM and the branch bit portion of the address to a next node is supplied by register 415. The data field contains decoded codewords only in those locations corresponding to a complete codeword manifested by the sequence of bits from register 415 over a period including a plurality of clock pulses. THe flag field located at each ROM 424 memory location contains a binary value bit representing the presence or absence of a decoded codeword at that address. If the data represented by the data field described above represents a complete received codeword, then the flag bit for these ROM locations has a binary value representing the receipt of a complete codeword, for example, a binary one. If a given ROM location does not represent a complete received codeword, then the flag assigned to that ROM location has the opposite binary value—i.e., continuing the example, a binary zero.

Output bus conductor 434 of ROM 424 receives the next address field information from the ROM memory for the previously addressed location. The conductor 52 receives the binary one codeword detection information bit flag (and binary zero no codeword detected bit flag). Output bus conductor 50 receives the data portion, i.e, the codeword one bit at a time. The conductor 52 receives the single-bit flag and conductor 50 receives an n-bit (preferably a ten-bit segment) representing the data information. The next address information is applied to conductor 434. The address to the ROM on conductor 434 is completed by the single encoded data bit output of register 415 on conductor 422 as has been discussed. That one bit is one of the sequentially occurring bits of a given received codeword processed by register 38.

In operation of the decoder, an encoded signal is converted to a serial stream of bits by converter 38 which applies the bits one bit at a time to register 415. A clock signal on conductor 416 clocks the contents of register 415 via conductor 422 to ROM 424 in conjunction with clocking the contents of register 420 to form the complete n+1 bit ROM address. The signal on conductor 52 is the code detected flag, which indicates whether or not a code has been detected. When either a line marker on conductor 37 or code on conductor 52 detected signal is high, a clear signal on conductor 418 is applied to register 420 which clears registers 415 and 420 and provides a zero address to ROM 324, resetting it to the first memory location. The marker signal is high when the code in register 300 (FIG. 3) matches the received marker code to be described.

If register 415 has a zero on conductor 422, then the zero address of ROM 424 is addressed. Since the register 420 has been cleared and the register 415 has supplied only one bit from a codeword to the ROM 424 and assuming the minimum code length for one code is assumed to be two, no codeword will be detected at this address. ROM 424 outputs a zero flag value on the code detected conductor 52 and outputs on bus conductor 434 the address of the node to the next sequentially stored memory location in ROM 424. This next node address will be clocked into register 420. In conjunction with the output of register 415, i.e., the branch bit, a complete address is applied at the next clock to ROM 424 via conductors 426 and 422.

If the address comprising the bits on conductors 426 and 422 do not represent a received codeword, then the next addressed memory location in ROM 424 will output a lack of code detection flag signal on conductor 52, that is a binary zero value, and also a next node address on bus conductor 434. Whether or not a code is detected is known a priori by the combination of a given ROM stored partial address and the output of register 415. That is, each codeword is at a branch address of a node in the search procedure. Depending on the nodes of the tree reached, a given memory address in combination with the known code bit output of register 415 can be determined to constitute a codeword. If that combination is known to form a codeword, then that complete input address will access the memory location containing the decoded codeword. Thus, a given number of cycles of next address in combination with a given output level from register 415 traverses the search tree and represents a decoded codeword. At the next clock signal on conductor 416, the next address on conductor 434 and the next bit in the encoded signal from register 415 are clocked to address ROM 424. If this combination of bits on conductors 426 and 422 represents a codeword (for example, a zero or non-zero value), then the ROM 424 will output a code detected signal, a binary one flag value on conductor 52. This binary one flag value clears register 420 and will output on bus conductor 50 the n-bit codeword representing that detected code value corresponding to that address. That n-bit codeword on conductor 50 is applied to data latch 54.

The binary one flag signal on conductor 52 is a clock or latch signal for latch 54. Whenever the next address on conductor 434 represents a lack of code being detected in ROM 424, the code detected flag signal on conductor 52 is zero and no latch signal on conductor 430 is applied to latch data into latch 54. In this way, latch 54 is not latched and the bits on conductor 50 are not applied to conductor 31. If a code is not found, the next bit in the serial input signal is applied to the one bit register 415 and is combined to the next address field from ROM 424 to provide a new complete address and the search for a codeword continues.

The receiver 16, FIG. 3, includes a special code register 300. The special code register locally generates a codeword which is identical to the transmitted line marker codeword generated by ROM 202 (FIG. 2). Parallel-to-serial register 38 has multiple taps 302 which output the received signal data bits in parallel. The outputs of register 300 applied to conductor 304 and of register 38 applied to conductor 302 are applied as inputs to comparator 306. Comparator 306 generates an output signal on conductor 37 when the special code of register 300 matches the bits on conductor 302. That output signal on conductor 37 is a signal designating a line marker. As previously discussed, that line marker signal represents the beginning of a scan line. It also defines a fixed number of data items, e.g., pixels between line markers. The line marker signal is applied to ROM 48 and, in particular, to the address register portion of register 48, e.g., registers 415 and 420, FIG. 4. The marker signal resets the address register of register 48 to synchronize the address register 48 of the ROM with an address that represents the beginning of a new codeword and a new scan line. Each scan line is known to start with a new codeword. Should data be lost for one or more scan lines, the decoder ROM ordinarily will lose synchronization with the received codewords and the scan lines they represent. By automatically resetting the decoder address register for each scan line, the decoder is thus automatically reset to identify the next received codewords at the start of a new scan line. Also, since the decoder is structured to decode the received bit streams one bit at a time as received, if portions of the bit streams are garbled by transmission, the system will automatically reset to hunt for legitimate codewords at the next scan line, knowing a priori that the received bits are the beginning of a codeword. Therefore, regardless how many scan lines or frames are lost in transmission, received bits are identified as a new codeword in a new scan line with each received line marker signal.

The output of address register and ROM 48 is applied to data latch 54 via bus conductor 50. The address register and ROM 48 generates a clock signal (the data latch signal mentioned above) on conductor 52 for clocking each decoded pixel or run length codeword, as applicable, into latch 54. At each clock, latch 54 outputs decoded data or run length binary encoded codewords to conductor 31. That clock signal is the code detected signal of FIG. 4.

The data latch 54 outputs on data bus conductor 31 are connected as inputs to post processor 32, FIG. 1, and to error detector 36. The signals on conductor 31 are applied as one switched input to detector 36 MUX 316 and as a MUX switch control signal on conductor 318. The MUX 316 is responsive to the most significant bit of the signal on the conductor 318 for selecting as an input to the MUX 316 the signal on either conductor 31 or on conductor 320. A third input of the MUX 316 is on conductor 320 which receives a reference signal having a binary value "1". If the most significant bit (msb) of the signal on conductor 318 indicates that a run length is present, then the MUX 316 applies the signal on conductor 31 to output conductor 322. If the msb indicates a non-zero value, then MUX 316 outputs the binary one value signal from conductor 320 to conductor 322. In the case of run lengths, the signal on conductor 322 has a binary value of the number representing the number of zeros in that run length. In contrast, if a non-zero value pixel is on conductor 31, MUX 316 generates an output signal on conductor 322 having the binary value one indicating one pixel. Adder 324 adds the binary values on conductor 322 to the values on conductor 330. The adder will add signals either having a binary value representing the total number of zeros in a given run length or one if a non-zero value is detected. In either case, the binary number on conductor 322 represents the actual number of pixels detected by MUX 316.

The line marker signal from comparator 306 is applied via conductor 37 as a clear input to latch 326. Latch 326 when cleared produces a zero count signal on conductor 330. When non-zero and run length values are received by MUX 316 the corresponding binary numbers representing their values are added by adder 324 to the count then stored in latch 326 via conductor 330. With the latch in the clear state, after receipt of a line marker on conductor 37, the output of adder 324 on conductor 328 is a signal having a binary value representing the binary value of the first received value on conductor 322. That value applied to conductor 322 is added to the previous signal value in latch 326 via conductor 330 by adder 324 to produce a sum signal on conductor 328. That sum signal represents the sum of the total number of pixels received since the occurrence of a line marker on conductor 37. Since prior to the receipt of the first pixel value of a scan line, the count in latch 326 is zero, the first pixel count value is stored in latch 326. This process is repeated for each sample value on conductor 322.

The output of latch 326 appears on conductor 330 which not only is applied to adder 324 but is applied as a count signal to comparator 332. The count signal on conductor 330 represents the actual number of pixels counted since the occurrence of the last occurring line marker which cleared latch 326. This binary count signal on conductor 330 is compared by comparator 332 to a known count value produced by register 334. Since in this embodiment the number of pixels or data items being counted is 240 which represents the number of pixels between the line markers, register 334 stores therein a binary count manifesting that 240 pixel count. Should the count on conductor 330 reach the number 240 then the output of comparator 332 on conductor 336 will be a binary one value indicating that a match has been sensed. Until a match is sensed, the output of comparator 332 is a binary zero value.

The binary value on conductor 336 is applied as an input to an exclusive OR gate 310. A second input to gate 310 is on conductor 37. The output of OR gate 310 is a binary one when one or the other inputs are high (but not when both are high or low). That is, the presence of a line marker signal on conductor 37 and a binary zero on the comparator 332 output (due to a lack of a match of the count signal on conductor 330, i.e., 240 pixels were not counted) at the time of receipt of a line marker (the end of a line) indicates an error. In the alternative, when the output of comparator 332 is a binary one indicating a 240 count but the line marker signal on conductor 37 is a binary zero indicating no line marker is present, then the 240 pixel count output of exclusive OR gate 310 is a binary one, also indicating an error condition.

When the signals on conductors 37 and 336 are both a binary one then that condition is sensed by AND gate 312 and is manifested by indicator 340 in response to the gate 312 output. Of course, if the signal on conductor 37 does not manifest the presence of a line marker and the count signal on conductor 330 is less than 240 pixel counts, then the system correctly identifies that as a non error situation. When comparator 306 generates a line marker signal on conductor 37 and comparator 332 generates a match signal on conductor 336 indicating 240 pixels have been counted, then the time coincidence of those signals as applied to gate 312 also indicates no error. Thus, regardless of whether a single data item or multiple data items are being counted, the error detector 36 will detect the absence of such data items.

The term "line" as employed herein is intended to mean generically to a group of data items and not necessarily limited to a physical line as occurs in a video image. A data item refers to a portion of that group or signal segment which has an identifiable fixed number of recurrences in each successive identifiable group, for example, codewords. Therefore, while lines of video signals are illustrated, these are shown by way of example and not by way of limitation.

What is claimed is:

1. An error detector for detecting the occurrence of errors in an encoded digital data information signal in a communication system, said signal comprising a plurality of codewords which may have different lengths, each codeword manifesting the value of at least one data item, said system tending to occassionally lose one or more data items, said detector comprising:
   means for periodically providing said data information signal a reference marker signal such that said data information signal has a given number of data items between adjacent successive reference marker signals;
   count means responsive to said information signal and said marker signals applied as an input thereto for generating a count signal representing the actual count of the number of received data items between each said adjacent successive reference marker signals; and
   means responsive to said count signal applied thereto for producing an error condition indication when the count of said count signal and said given number differ.

2. The detector of claim 1 wherein said data items are pixels in a video signal, said video signal comprising a plurality of successive frames, each frame having a plurality of lines, said given number manifesting the number of pixels in each line.

3. The detector of claim 1 wherein said means for providing a reference marker signal includes means for providing a unique codeword to said information signal representing said marker signal, said count means including unique codeword sense means for sensing the presence of said unique codeword in said information signal and for generating a marker present signal upon said sensing, said count means further including reset means responsive to said marker present signal for resetting the data item count upon the inputting of said marker present signal thereto.

4. The detector of claim 3 wherein said codeword sense means comprises comparator means for comparing the codewords of said information signal to a reference signal representing said unique codeword for generating said marker present signal in the presence of a match.

5. The detector of claim 1 wherein said communication system includes a transmitter encoder for encoding said information signal into said plurality of codewords, said information signal comprising a video signal having a plurality of successive frames, each frame having a plurality of scan lines, said encoder including a ROM containing a look up table for said codewords, each codeword at a unique ROM address; said means for providing said information signal a reference marker signal including: said ROM for storing a reference marker codeword therein, marker address means for generating a ROM address signal for addressing and selecting said unique marker codeword from said ROM for transmission in said communication system, switch means for applying said ROM address signal to said ROM in response to a marker select signal, and means responsive to said information signal for generating said marker select signal in time coincidence with the beginning of each scan line.

6. An error detector for detecting the occurrence of errors in an encoded digital data video information signal in a communication system, said signal manifesting a plurality of scan lines each having a plurality o pixels, each pixel encoded with a codeword of a given length, said system for transmitting said codewords to a receiver, said detector comprising:
   means for encoding said signal with a plurality of unique codeword reference marker signals for transmission to said receiver, each marker signal representing the beginning of a scan line, each scan line having the same given number of pixels;
   means for comparing the transmitted received encoded information signal with a reference signal manifesting said unique codeword marker signal to generate a line marker signal upon the occurrence of each said unique codeword marker signal in said received information signal;
   means responsive to said generated line marker signal for generating a count signal representing the number of pixels counted between successive ones of said marker signals; and
   means for indicating an error condition when the count of said count signal differs from said given number.

7. The detector of claim 6 wherein said means for generating a count signal includes means for decoding said information signal to generate a decoded signal, count means responsive to said decoded signal and to said marker signal for counting decoded pixels between successive marker signals to produce a count signal and means responsive to said count signal and to a reference signal manifesting said given number for producing a first signal when the count of said pixels matches said given number, said means for indicating an error including means for producing an error indication when the count of said pixels differs from said given number.

8. The detector of claim 7 wherein said count means includes means responsive to said marker signal applied thereto for resetting the count.

9. The detector of claim 6 wherein said receiver includes a decoder for decoding the transmitted information signal, said decoder having a reset state and including means responsive to said line marker signal for resetting the decoder to said reset state upon the occurrence of each generated line marker signal.

10. An error detector for determining loss of transmission of one or more encoded pixels in a digital video signal in a communication system, said signal comprising n pixels per scan line, said detector comprising:
    means for inserting a marker codeword in said signal to mark the beginning of each scan line;
    means for transmitting said signal including said marker codeword to a receiver;
    receiver means for detecting each said received marker codeword and for generating a marker signal in response to said detecting;
    means for counting the number of received pixels subsequent to each received marker and for generating a count signal manifesting the pixel count;

means for comparing said marker signal with said count signal to generate a first signal when the count is n and a second signal when the count is less than n; and means responsive to said marker, first and second signals for generating an error indicating condition when only one of said marker and first signals are present.

11. The detector of claim 10 wherein said system includes an encoder, said encoder including ROM means for generating pixel value codewords representing non-zero and zero run length pixel values, said detector including means responsive to said pixel value codewords for generating a pixel signal manifesting the number of pixels corresponding to each said codewords, said means for counting the number of received pixels including means responsive to said pixel signal for generating said count signal.

12. The detector of claim 11 wherein said ROM means includes means for generating a binary value signal manifesting the binary count of consecutive zero value pixels in a given run length and for generating a flag signal manifesting a non-zero pixel value, said means for generating a pixel signal including means for generating a third signal manifesting a one count in response to each said flag signal and for outputting said binary value signal in response to the receipt of a run length count, said counting means including means for adding said one and binary value signals.

13. The detector of claim 12 wherein said counting means includes an adder responsive to said one and binary count signal for adding said one and binary count signals to a sum signal and a latch for storing the summed output of said adder to produce said sum signal, said latch including reset means responsive to said marker signal for resetting the count of said latch.

* * * * *